(12) United States Patent
Hartman

(10) Patent No.: US 7,913,331 B2
(45) Date of Patent: Mar. 29, 2011

(54) INTEGRATED DOMESTIC UTILITY SYSTEM

(76) Inventor: Reinoud Jacob Hartman, Nanaimo (CA)

( * ) Notice: Subject to any disclaimer, the term of this patent is extended or adjusted under 35 U.S.C. 154(b) by 536 days.

(21) Appl. No.: 12/045,011

(22) Filed: Mar. 9, 2008

(65) Prior Publication Data

US 2009/0222981 A1 Sep. 10, 2009

(51) Int. Cl.
*A47K 4/00* (2006.01)
(52) U.S. Cl. .......................................................... 4/665
(58) Field of Classification Search .................. 004/665
See application file for complete search history.

(56) References Cited

U.S. PATENT DOCUMENTS

| | | | | |
|---|---|---|---|---|
| 4,197,597 A | * | 4/1980 | Toms | 4/300 |
| 4,349,436 A | * | 9/1982 | Kaump | 210/104 |
| 4,655,244 A | * | 4/1987 | Park | 137/412 |
| 5,106,493 A | * | 4/1992 | McIntosh | 210/100 |
| 5,251,346 A | * | 10/1993 | Donati | 4/665 |
| 5,301,745 A | * | 4/1994 | Seib et al. | 165/47 |
| 6,314,590 B1 | * | 11/2001 | Lee | 4/286 |
| 2008/0141455 A1 | * | 6/2008 | Harrison | 4/665 |

* cited by examiner

*Primary Examiner* — Charles Phillips
(74) *Attorney, Agent, or Firm* — Gordon Thomson

(57) ABSTRACT

An integrated domestic utility system is used to recycle grey water in a domestic house as a means to divert treated potable water away from non-potable uses, and in particular, toilet flushing. The system comprises a rainwater tank for storing rainwater collected from a roof top and a grey water tank to store grey water collected from a shower or bathtub. The rainwater is used to augment the grey water supply through a self regulating valve. Domestic water can also be used to replenish the grey water tank. A demand amount of grey water is pumped from the storage tank to at least one toilet tank. The system is controlled by a controller using pressure sensors and temperature sensors. The invention may include a solar heating circuit coupled to a domestic water heater. In one example of the invention, the system stores grey water in a bathtub and supplies it to toilet tank.

5 Claims, 5 Drawing Sheets

INTEGRATED DOMESTIC UTILITY SYSTEM

CROSS-REFERENCES TO RELATED APPLICATIONS

None.

FIELD OF THE INVENTION

This invention is related to the field of liquid separation and more particularly relates to an integrated domestic utility system adapted to recycle grey water for domestic uses such as flushing toilets.

BACKGROUND OF THE INVENTION

Water conservation is becoming increasingly important as the cost of treating domestic water increases and sources of clean feedstock become scarce. In most domestic households treated domestic water is used to flush toilets. This is a waste of a valuable commodity. It also increases the cost of sewage treatment charged to the home owner because the municipal cost of sewage treatment is largely based on the amount of domestic water consumed. Furthermore, solar energy is not effectively used as a means to heat domestic water as it remains expensive to purchase and install the components. Therefore, fresh cold water is sent to the hot water heater requiring significant amounts of thermal energy to bring it to a desired temperature. Rainwater is a source of toilet flush water that is often overlooked.

A number of attempts have been made to solve the problem of conserving domestic water. For example, U.S. Pat. No. 4,228,006 "Domestic Water System" issued to Hanna on Oct. 14, 1980 discloses a system whereby grey water from various in-home sources is directed to a clarifier. Chlorine is added. The water is then reused for non-potable applications. Hanna relies upon the addition of toxic chemicals and does not utilize solar energy for heating. The use of rain water is over looked by Hanna. In U.S. Pat. No. 5,406,657 "Water Recycling Device for Flush Toilet Use" issued to Donati on Apr. 18, 1995 there is disclosed the use of grey water to supply the toilet tank with flushing water. This system can be retrofitted into existing domestic plumbing systems. The Donati system relies upon an external pond to collect rain water. This source can become easily contaminated and turbid and is not suitable for pumping through domestic household pipes. Another example is found in U.S. Pat. No. 6,889,395 "Flush Reservoir" issued to Hodges on May 10, 2005. Hodges discloses a rain water collection system for toilet flushing. However, no grey water is used.

Therefore, there continues to be a need for an integrated domestic utility system that uses both grey water recycling and rainwater to satisfy demands for non-potable water in a house, for example, toilet flushing. There is a further need for an integrated domestic utility system that takes advantage of available solar energy to maintain a readily available source of grey water at a suitable temperature for indoor use.

SUMMARY OF THE INVENTION

My invention is an integrated domestic utility system comprising a rainwater tank for collecting and storing a predetermined volume of rainwater, a grey water tank for collecting and storing a predetermined volume of grey water and a valve to regulate flow from the rainwater tank to the grey water tank. The invention further comprises a pump for distributing a demand amount of grey water from grey water tank to at least one toilet fixture storage tank for flushing. Solar heating is used to maintain the stored grey water at a desired temperature. The rainwater is collected from at least one rainwater collection point in fluid communication with an at least one rainwater flush tank having debris removal means and overflow means. The rainwater flush tank is disposed hydrodynamically below the rainwater collection point. The rainwater storage tank is disposed hydrodynamically below the rainwater flush tank and in fluid communication therewith, so that the rainwater storage tank continues to receive a flow of rainwater from the rainwater flush tank until it is full. Excess rainwater is directed to the overflow means. The invention also comprises at least one grey water collection point such as a shower or bathtub that is in fluid communication with the grey water storage tank.

In another example of the invention there is found programmable control means for controlling operation of the system.

In one example of the invention the pump is controlled by a pressure switch designed to sense fluid pressure in the pump discharge conduit so that when a toilet is flushed the pump starts and pumps water from the grey water storage tank to replenish the toilet tank.

In yet another example of the invention a solar heating heat exchange circuit is used to maintain the grey water stored in the grey water tank at a suitable temperature which can be predetermined. There may be a roof mounted solar collector that transfers heat to a heat exchanger located in the grey water storage tank. The heat exchanger is simple to fabricate and so inexpensive to install. The water temperature is controlled by controlling the flow of heat transfer fluid from the solar collector to the heat exchanger.

In one example of the invention a domestic hot water heater can be added to the heat exchange circuit to pre-heat domestic hot water thereby saving energy.

In another example of the invention there is provided an integrated domestic utility system on a small scale for installation in a bathroom. It collects and stores grey water using a bathtub. Grey water is pumped from the bathtub to a nearby toilet flush tank by means of a pump. A pressure switch senses fluid pressure in the pump discharge conduit so that when the toilet is flushed the pump starts and pumps water from the tub to the empty toilet tank. A controller senses when grey water in the tub is low and permits a supply of domestic water to replenish the supply of bathtub water so that the toilet always has a source of flush water.

OBJECTS AND ADVANTAGES OF THE INVENTION

Several objects and advantages of the invention are:
a. to save domestic treated water by diverting it away from non-potable uses;
b. to recycle and store grey water for non-potable uses;
c. to rely upon rain water to augment grey water storage;
d. to collect and store rain water for non-potable domestic use;
e. to reduce domestic sewage volumes by first recycling grey water;
f. to rely upon solar energy to heat stored grey water to a suitable temperature;
g. to augment domestic hot water heating using solar energy;
h. to provide an integrated domestic water supply system that can be installed in a home; and, i. to provide a small scale integrated domestic water system that can be installed in a bathroom for recycling grey water from a bathtub.

Still further objects and advantages of my invention will become apparent from a consideration of the ensuing description and drawings.

DETAILED DESCRIPTION

Figure 1:
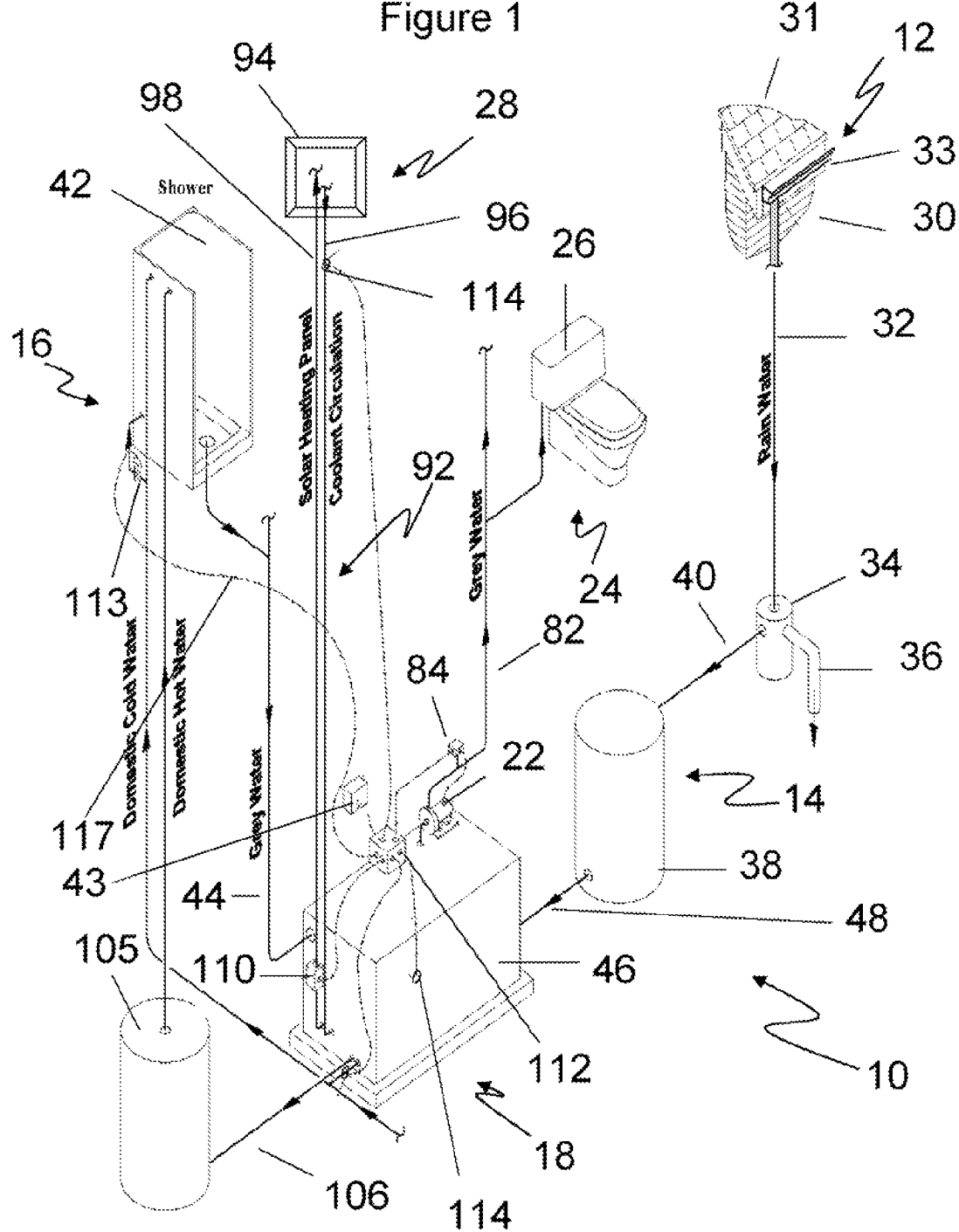
FIG. 1 is a schematic of one example of an integrated domestic utility system.

Referring to FIG. 1, the invention (10) is an integrated domestic utility system comprising means for collecting a predetermined volume of rainwater (12), means for storing the predetermined volume of rainwater (14), means for collecting a predetermined volume of grey water (16), means for storing the predetermined volume of grey water (18), a self-regulating valve (20) (Not illustrated in FIG. 1. See FIG. 3) disposed between the means for storing the predetermined volume of rainwater and the means for storing the predetermined volume of grey water, a pump (22) for distributing a demand amount of grey water from the means for storing the predetermined volume of grey water to an at least one toilet fixture (24) storage tank (26) for flushing the toilet and means (28) for maintaining the predetermined volume of grey water at a desired temperature.

Still referring to FIG. 1, means (12) for collecting a predetermined volume of rainwater comprises an at least one rainwater collection point (30). In the illustration, the rainwater collection point is a roof top (31) trough (33) in fluid communication by way of conduit (32) with an at least one rainwater flush tank (34) having debris removal means (inside the flush tank and not illustrated but consisting of siphons and other devices well known to remove floating or sinking debris) and overflow means (36). The at least one rainwater flush tank (34) is disposed hydrodynamically below the at least one rainwater collection point (30) so that water flows by gravity from the high point to the low point and no powered devices are required.

In FIG. 1, means (14) for storing the predetermined volume of rainwater comprises a rainwater storage tank (38) having the predetermined volume and disposed hydrodynamically below the at least one rainwater flush tank (34) and in fluid communication by way of conduit (40) with the rainwater flush tank. The rainwater storage tank (38) continues to receive a flow of rainwater by way of conduit (40) from the at least one rainwater flush tank (34) until full. Excess rainwater is directed towards overflow means (36).

Still referring to FIG. 1, means (16) for collecting a predetermined volume of grey water comprises at least one grey water collection point (42). In FIG. 1 the grey water collection point (42) is illustrated as a shower stall but it could also be a bath tub. These points are chosen as they represent the largest source of grey water which is relatively organic matter free. Dishwater from a sink or dishwashing machine is not used because it contains a large concentration of organic matter that can become biologically active and contaminate the grey water collection and storage system causing odors and health concerns. The grey water collection point (42) is in fluid communication by way of conduit (44) with means (18) for storing the predetermined volume of grey water comprising a grey water storage tank (46) having the predetermined volume. The rainwater storage tank (38) is in fluid communication by conduit (48) with the grey water storage tank (46) by way of the self regulating valve (20) previously identified and more fully described below. The grey water storage tank is disposed hydrodynamically below the rainwater storage tank for gravity induced flow.

Figure 2:
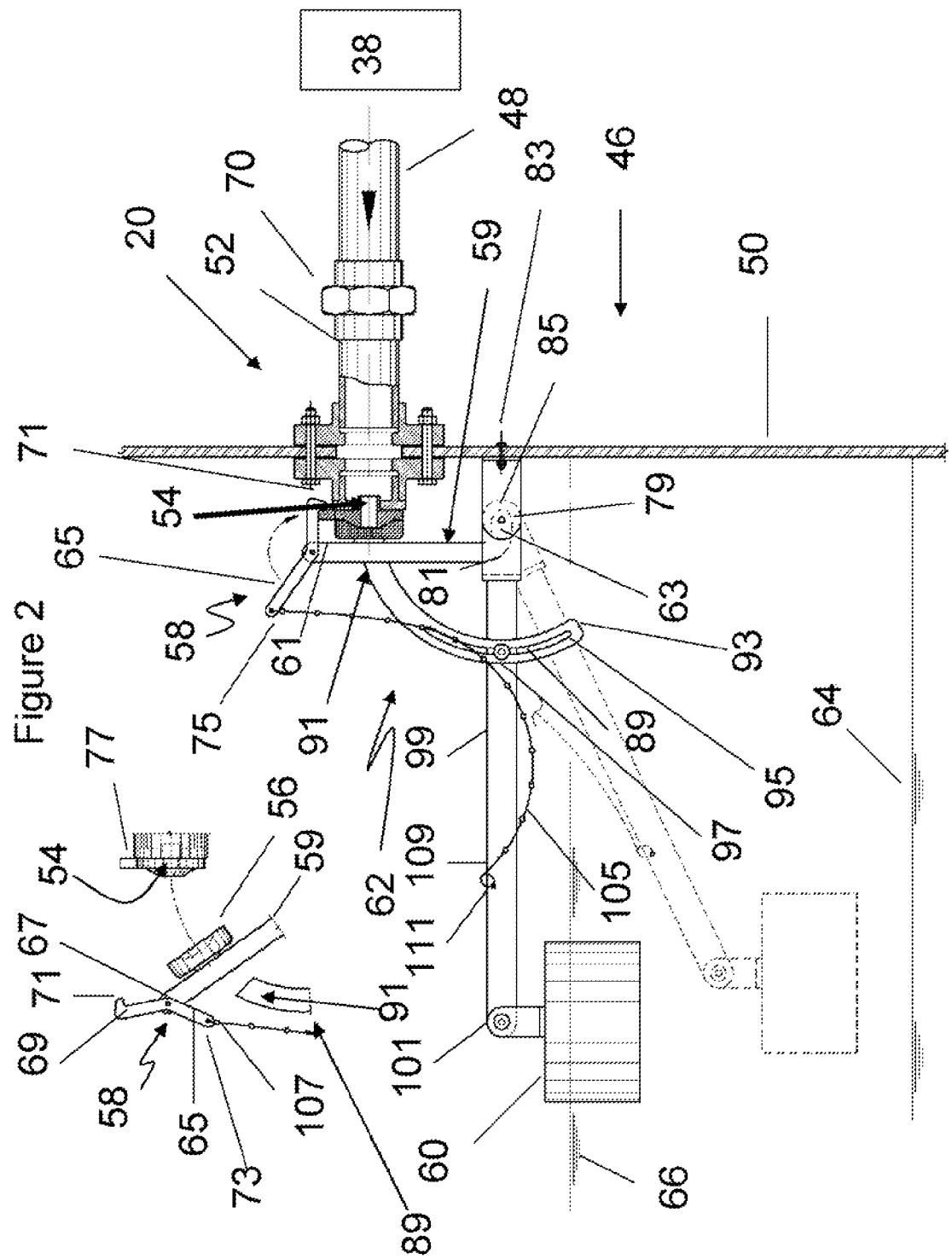
FIG. 2 is an illustration in side cross-sectional view of a self-regulating valve between the rainwater storage tank and the grey water storage tank of one example of the invention.

Now referring to FIGS. 1 and 2, there is shown a diagram of the self regulating valve (20). The self regulating valve (20) is disposed within a wall (50) of the grey water storage tank (46). The valve comprises an intake conduit (52) in fluid communication by way of conduit (48) with the rain water storage tank (38). Conduit (52) and conduit (48) are joined by a suitable connector (70). The valve includes an inlet orifice (54) for discharging rain water into the grey water storage tank (46). The orifice is sized so that the flow into the grey water tank is controlled at a predetermined flow rate which is generally greater than the pump rate. However, the pump is equipped with detectors that can sense when the pump intake is dry due to depletion of all rain and grey water and then the system's programmable controller (112) by way of control cable (117) causes a solenoid controlled valve (113) to open causing an infusion of domestic water into the shower stall (42) draining into the grey water tank to ensure that the pump suction does not go dry and that pump demand is always met. A compression seal flap (56) seals the inlet orifice (54) in a locking relationship using a locking means (58). The compression seal flap (56) is attached to a mounting member (59) having a first end (61) and a second end (63). The first end (61) mounts a rocking locking arm (65) at its mid point (67). The locking arm (65) comprises a first end (69) having a locking hook (71) and a second end (73) having a mounting hole (75). In operation, biased locking arm (65) locking hook (71) engages a locking nub (77) disposed above orifice (54) to keep the compression seal flap (56) tight against the orifice (54). The second end (79) of mounting member (59) is pivotally attached at axis (85) to member (81) mounted to wall (50) of the tank by mounting means (83). The mounting member (59) is adapted for about 20 degree rotation about axis (85) as water in the grey water tank moves up and down with demand. Locking means (58) further includes a curved member (89) having a first free end (91) adapted to abut the mounting member (59) and a second free end (93). The inset shows that free end (91) is not attached to mounting member (59) but moves up and down with the level of water in the grey water tank. Member (89) has a curved slot (95) adapted to accept a locking screw (97) on float arm (99) so that as the float arm (99) moves up and down around axis (85) in response to water level the curved member (89) rotates along with it. The locking screw (97) allows adjustment of the sealing movement of the mounting member (59) in respect of the water level elevation. Attached to the end (101) of the float arm (99) is a water level float (60) adapted for floatation within the grey water tank. The float is in mechanical communication with the locking arm (65) by way of actuating member (105). The first end (107) of the actuating member is fixed to the second end (73) of the locking arm through mounting hole (75). The second end (109) of the actuating member (105) is attached to the float arm (99) at a point (111)

that induces sufficient leverage on the locking arm (65) so that it is pulled down by the actuating member thus releasing locking hook (71) from locking nub (77). The compression seal flap (56) will disengage from the orifice (54) with the mounting member (59) falling to rest on the end of the curved member (89) permitting water flow from the rain water storage tank (38) through the completely-opened orifice (54) into the grey water storage tank. The valve (20) will thus periodically open completely to ensure that the orifice may flush and so is kept free of debris so that the compression seal can be absolute, thereby preventing seepage of rainwater into the grey water tank over time. As the grey water storage tank fills with rainwater in response to the release of the locking arm, the partially-submerged float rises to a point where the curved member free end (91) engages and pushes the mounting arm (59) with compression seal (56) against the orifice (54) thereby closing the self regulating valve (20). A later additional infusion of grey water further elevates the water level and submerges the float to provide the additional upward force to the locking arm required to finally lock the valve closed, now prepared for another rainwater dosing requirement.

Figure 3:
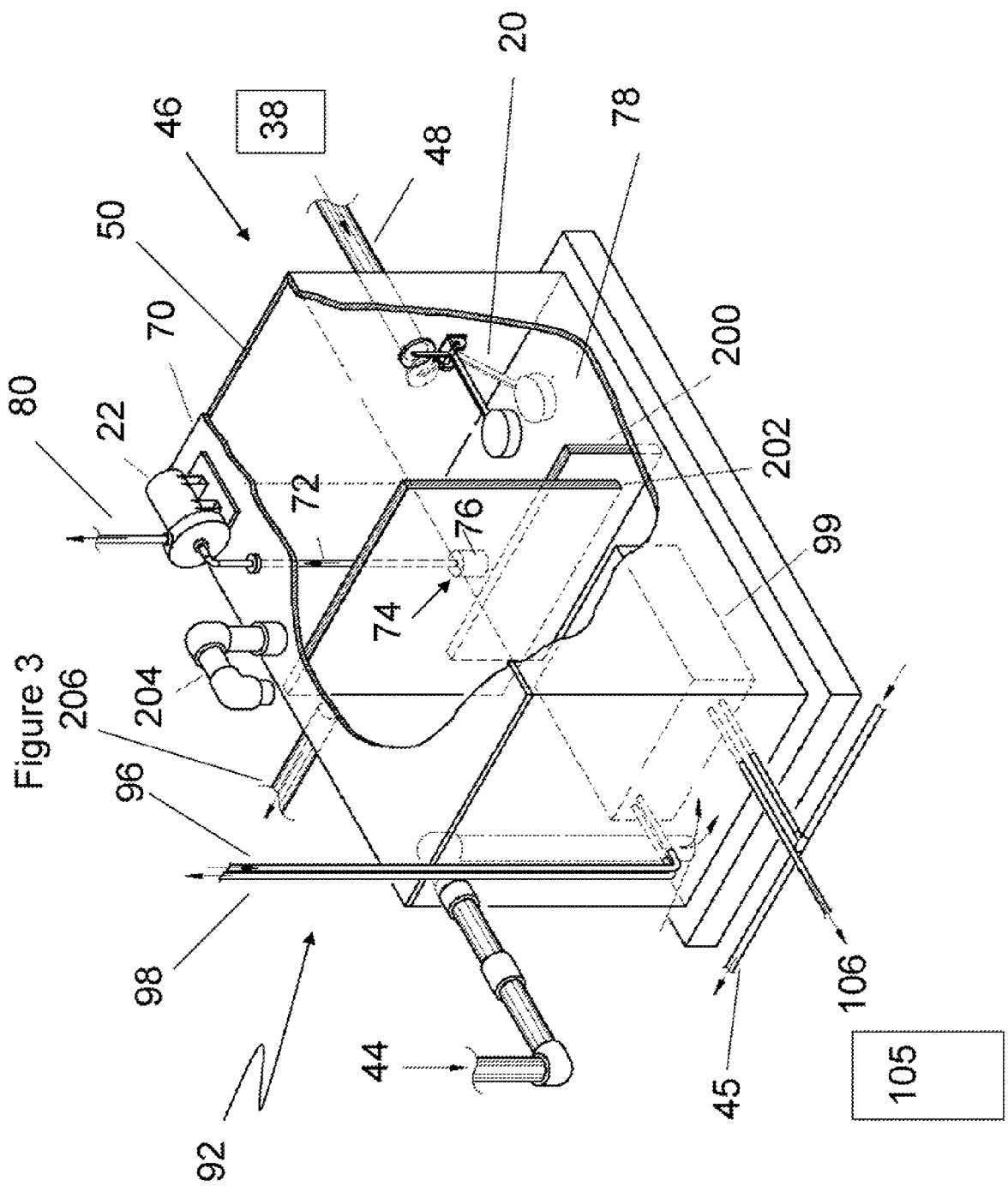
FIG. 3 is a sectional illustration of a grey water storage tank of one example of the invention.

Referring now to FIGS. 1 and 3, there is shown the grey water storage tank (46) in greater detail. The grey water tank in this figure is illustrated as rectangular but it can be other shapes. Elements illustrated in FIG. 3 include conduit (48) from the rain water tank (38), self regulating valve (20) mounted in wall (50) of the grey water storage tank, tank lower baffle plate (200) and tank upper baffle plate (202), tank vent (204), tank overflow pipe (206) which is connected to the domestic sewer, grey water collection system intake pipe (44) and domestic hot water connections (106) to the hot water tank (105). Domestic cold water pipes are shown as item (45). Grey water will enter the grey water tank as shown in FIG. 3. The water will flush the sitting water retained by the lower baffle and have the opportunity to settle. Any grey water components float to the surface of the water. The top baffle ensures that these components do not enter the pump side of the grey water storage tank. The lower baffle retains a body of water and allows the settling of any sinking grey water components. As the level of intake water rises in the grey water tank, the floating matter will be forced out of the tank by way of the overflow pipe which is connected to the domestic sewer. The overflow pipe has a trap (not shown) to prevent backflow of sewer gas into the grey water tank. The grey water tank can be periodically accessed by a hatchway (not shown) and cleaned of the settled matter. The pump (22) is disposed in close proximity to the grey water tank (46) and is powered by a source of 12 VDC power (43) which source powers the programmable controller (112) as well. In the example shown the pump is placed on the top surface (70) of the grey water tank but it could be located elsewhere. The pump comprises a suction conduit (72) having an intake (74) with an intake filter (76) disposed proximate to the bottom (78) of the grey water tank (46). There is also a discharge conduit (80) in fluid communication by conduit (82—See FIG. 1) with the at least one toilet fixture storage tank (26). The pump (22) further comprises a pressure switch (84) for pump control by sensing fluid pressure in the discharge conduit (80). When the at least one toilet fixture storage tank (26) is flushed, the toilet tank valve opens, and a low pressure is sensed by the pressure switch. The switch turns the pump on to pump water from the grey water storage tank to the toilet tank. When the toilet tank reaches a full state its valve closes, thus the pressure switch senses a high pressure and turns the pump off.

Figure 4:
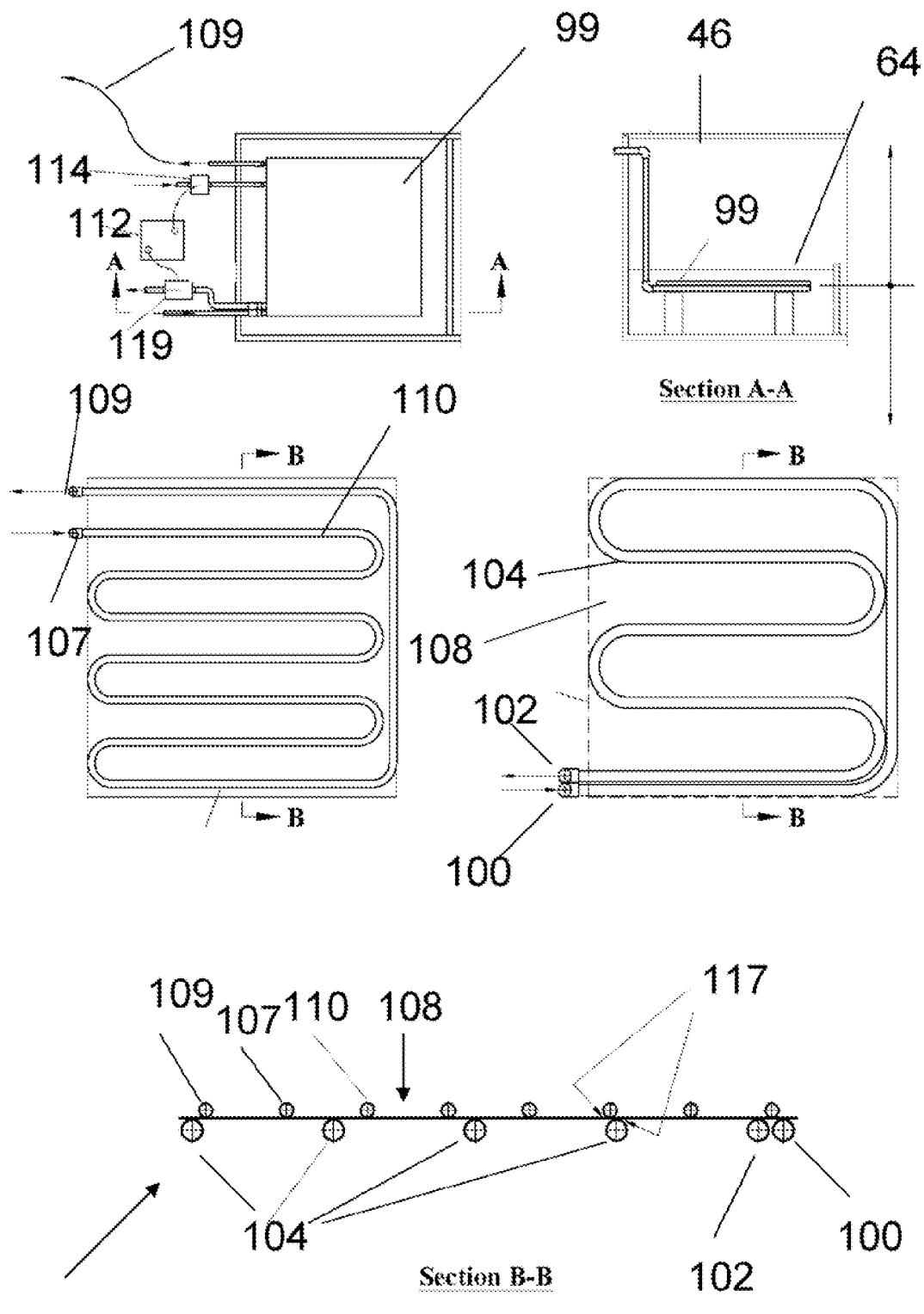
FIG. 4 is a collection of drawings of the heat exchanger within the grey water storage tank of one example of the invention.

Now referring to FIGS. 1, 3 and 4, various elements of means (28) for keeping the predetermined volume of grey water at a desired temperature are illustrated. Means (28) comprises a heat exchange circuit (92). The exchange circuit (92) comprises at least one solar energy collector (94) in recirculating heat transfer fluid communication by conduits (96) and (98) with a radiating heat exchanger (99) disposed within the grey water storage tank (46) and submerged below the bottom baffle level (See FIG. 3, Item 200). The radiating heat exchanger (99) comprises a heat transfer fluid intake (100), a heat transfer fluid discharge (102) and a radiating coil (104) between said heat transfer intake (100) and discharge (102). The radiating heat exchanger is adapted to radiate collected solar energy from the recirculating heat transfer fluid within the heat exchange circuit into the stored grey water until said desired temperature is achieved. As shown in FIG. 4, the radiating heat exchanger (99) comprises a sheet of copper (108) with the radiating coil (104) on the underside and a domestic water heating coil (110) on the top side of the copper sheet. The coils are fixed to the copper sheet by suitable fixing means such as solder (117). The copper sheet transfers heat by conduction from the heat transfer coil to the domestic water heating coil (110). The domestic water heating coil (110) has an intake (107) for cold domestic water and a hot water output (109) coupled to conduit (106) into the domestic water heater (105). The tubing used in the heat exchanger is copper but other materials with suitable heat transfer properties can be used. The heat transfer fluid is a mix of propylene glycol/water but any suitable heat transfer fluid can be used.

The recirculating heat transfer fluid is recirculated by a pump (119). The pump is a two stage pump. The controller can sense a temperature drop in domestic water supply tubing as it enters the heat exchanger and interprets this as a hot water demand. The controller will then switch from pumping the heat transfer fluid from the low rate to the high rate so as to heat the water as quickly as possible. The heat exchange circuit is controlled by programmable control means (112) comprising temperature sensing means (114) and adapted to maintain the temperature of the recirculating heat transfer fluid within a first desired range and the temperature of the grey water within the grey water storage tank within a second desired range.

Figure 5:
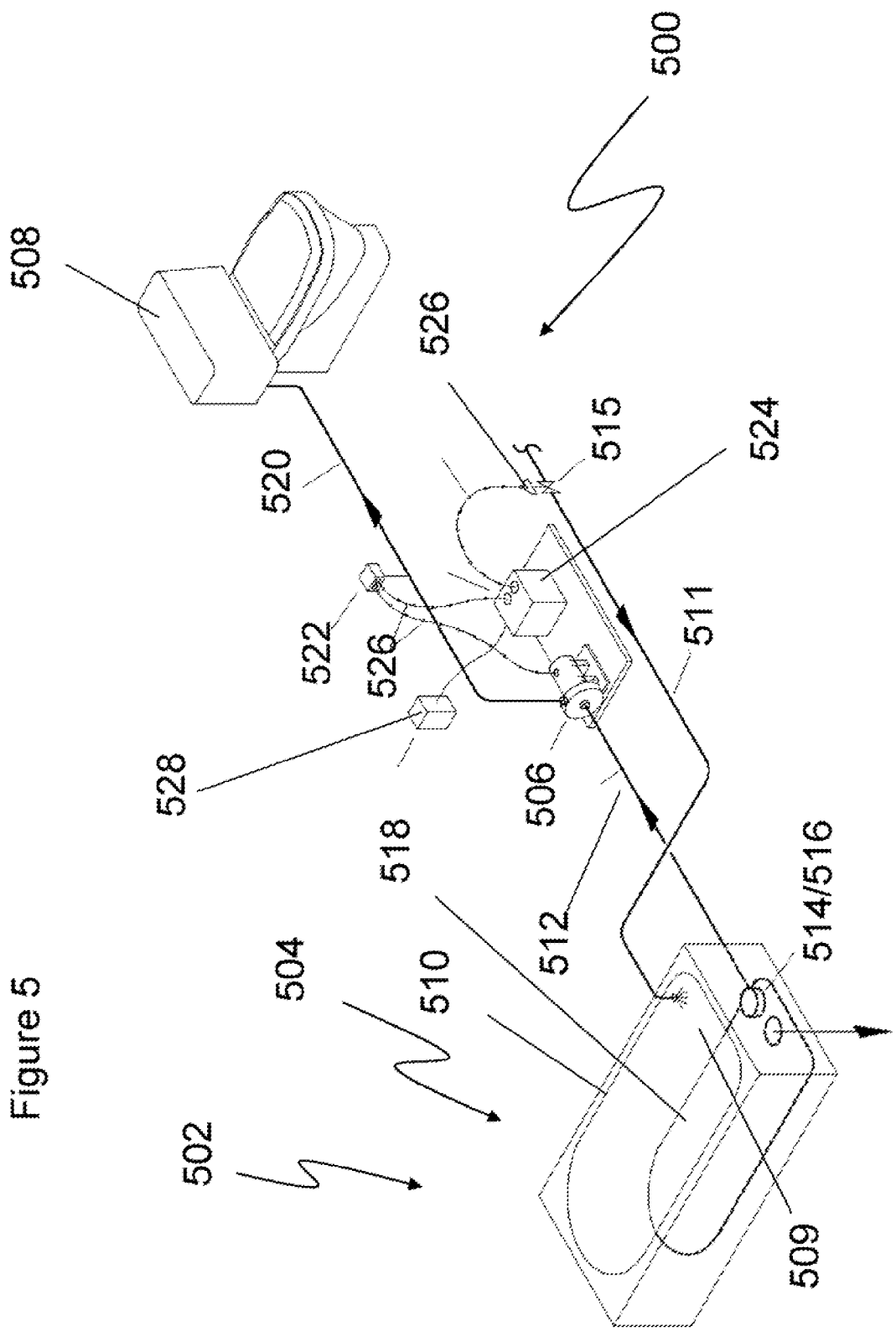
FIG. 5 is a schematic of one example of a small scale integrated domestic utility system suitable for installation in a bathroom.

Referring now to FIG. 5 there is shown another example (500) of the invention. This example of the invention is intended to be portable and easy to install in any bathroom. In this example the integrated domestic water storage system comprises means (502) for collecting a predetermined volume of grey water, means (504) for storing the predetermined volume of grey water, a pump (506) for distributing a demand amount of grey water from the storage means to a toilet fixture storage tank (508) for flushing and programmable control means (524) for controlling the flow of domestic water through an air-gap (509) into the means for collecting and means for storing a predetermined volume of grey water which comprises a bathtub (510). In another example there may be an additional storage tank disposed below the bathtub to collect and store grey water drained from the bathtub. In that example, the pump suction would be located at the bottom of the storage tank. The bathtub is supplied with domestic water by normal means (not shown). The pump (506) is disposed in close proximity to the bathtub and comprises a suction conduit (512) having an intake (514) with an intake filter (516) disposed on the bottom (518) of the bathtub or adjacent tank and a discharge conduit (520) in fluid communication with the toilet storage tank (508). The pump further comprises a pressure switch (522) for sensing fluid pressure in the discharge conduit so that when the toilet fixture storage tank is flushed the pump starts and pumps water from the tub to the empty toilet fixture tank. The system is controlled by way of a programmable controller (524) connected by plurality of cables (526) to a plurality of sensors and powered by a source of 12 VDC power (528), which source powers the pump (506) as well. The controller determines if the water level is dropping to near the elevation of the pump intake (514), at which time it opens solenoid valve (526) to allow a dose of domestic water to enter the storage means via a conduit (511) to meet the demand of the pump.

Accordingly, the reader will see that the integrated domestic utility system of this invention has the advantages of using simple components, ease of installation in a pre-existing home over a pre-existing domestic water system with few modifications to that system, no reliance upon toxic chemicals for water purification, use of readily available solar energy for heating, use of readily available rain water for domestic non-potable uses, small scale applications within an individual bathroom and inexpensive installation to encourage adoption by the public.

Although the description above contains specificities, these should not be construed as limiting the scope of the invention but as merely providing illustrations of some of the examples of the invention. For example, the storage tanks can be any useful shape and volume and the pumps can be AC or DC powered. Thus the scope of the invention should be determined by the appended claims and their legal equivalents rather than by the examples given herein.

What is claimed is:

1. An integrated domestic utility system comprising;
   a. means for collecting a predetermined volume of rainwater;
   b. means for storing said predetermined volume of rainwater;
   c. means for collecting a predetermined volume of grey water;
   d. means for storing said predetermined volume of grey water comprising a grey water storage tank;
   e. a self-regulating valve between said means for storing the predetermined volume of rainwater and said means for storing the predetermined volume of grey water;
   f. a pump for distributing a demand amount of grey water from the means for storing the predetermined volume of grey water to an at least one toilet fixture storage tank for flushing;
   g. means for maintaining the predetermined volume of grey water at a desired temperature, comprising a heat exchange circuit;
   further comprising a programmable controller for controlling the grey water tank water level and ensuring it does not run dry;
   wherein, said pump is disposed in close proximity to the grey water tank and comprises a suction conduit having an intake with an intake filter disposed proximate to the bottom of the grey water tank and a discharge conduit in fluid communication with the at least one toilet fixture storage tank;
   wherein, the pump further comprises a pressure switch for sensing fluid pressure in said discharge conduit so that when a valve in the at least one toilet fixture storage tank opens due to flushing, the pump starts and pumps water from the grey water storage tank to the empty at least one toilet fixture tank; and,
   wherein said heat exchange circuit comprises at least one solar energy collector in re-circulating heat transfer fluid communication with a radiating heat exchanger disposed within the grey water storage tank and permanently submerged below the water retained behind a baffle therein, wherein said radiating heat exchanger comprises a heat transfer fluid intake, a heat transfer fluid discharge and a radiating coil between said heat transfer intake and discharge.

2. The integrated domestic utility system of claim 1 wherein the radiating heat exchanger is adapted to radiate collected solar energy from the recirculating heat transfer fluid into the stored grey water until said desired temperature is achieved.

3. The integrated domestic utility system of claim 2 wherein the heat exchange circuit further comprises a domestic hot water heater in re-circulating heat transfer fluid communication with the radiating heat exchanger so that residual solar energy retained in the heat transfer fluid and grey water discharging from the radiating heat exchanger is used to heat domestic water within said domestic hot water heater.

4. The integrated domestic utility system of claim 3 wherein the recirculating heat transfer fluid is re-circulated by a pump.

5. The integrated domestic utility system of claim 4 wherein the heat exchange circuit is controlled by said programmable controller and temperature sensing means and adapted to maintain the temperature of the re-circulating heat transfer fluid within a first desired range and the temperature of the grey water within the grey water storage tank within a second desired range.

* * * * *